W. T. GRADY.
FILING APPARATUS.
APPLICATION FILED JUNE 5, 1909. RENEWED OCT. 22, 1910.
977,003.
Patented Nov. 29, 1910.
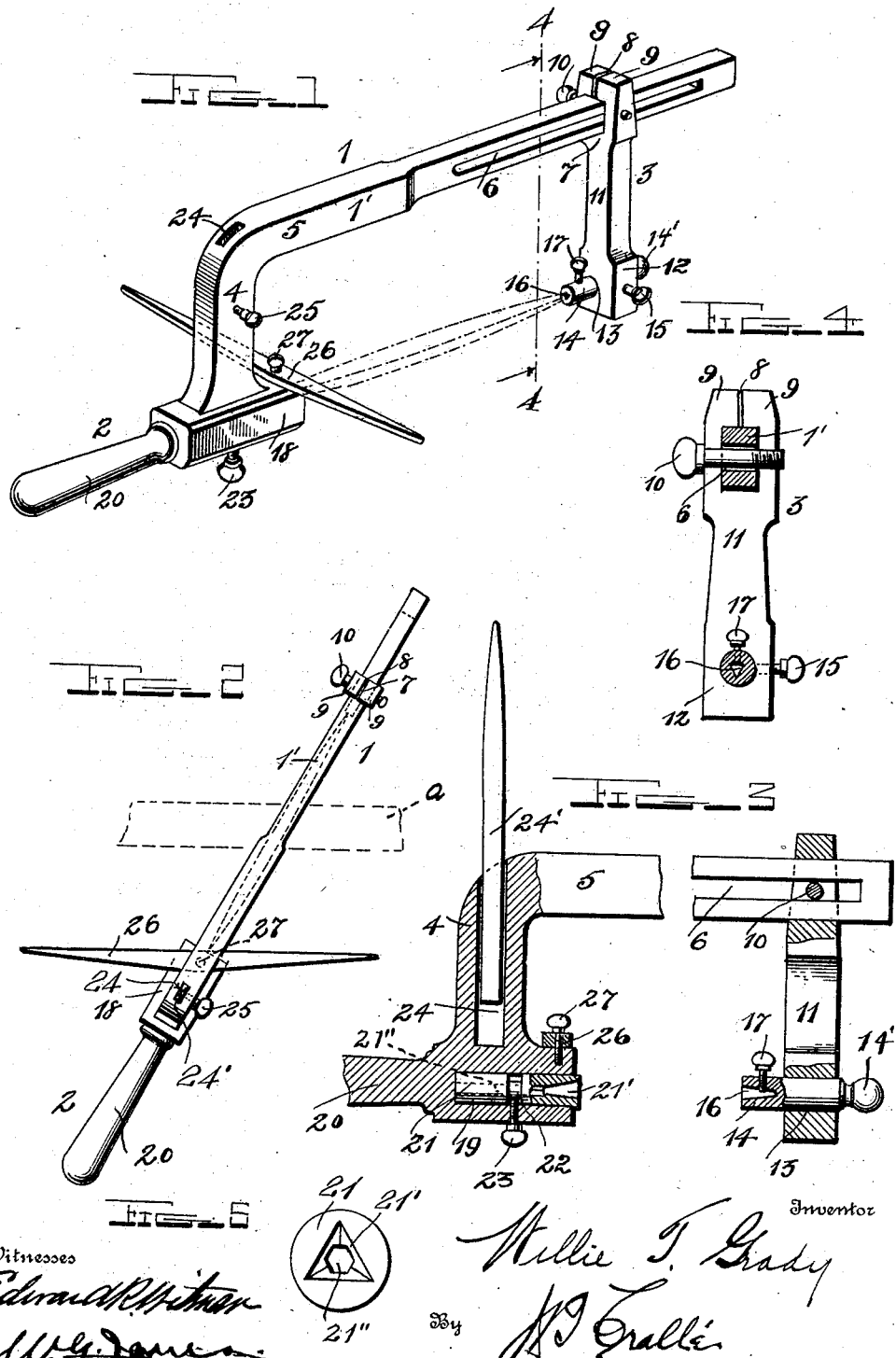

UNITED STATES PATENT OFFICE.

WILLIE T. GRADY, OF ORANGE, VIRGINIA.

FILING APPARATUS.

977,003.     Specification of Letters Patent.     Patented Nov. 29, 1910.

Application filed June 5, 1909, Serial No. 500,426. Renewed October 22, 1910. Serial No. 588,576.

*To all whom it may concern:*

Be it known that I, WILLIE T. GRADY, a citizen of the United States, residing at Orange, in the county of Orange and State of Virginia, have invented certain new and useful Improvements in Filing Apparatus, of which the following is a specification.

This invention relates to certain improvements in filing apparatus, and pertains more particularly to a hand operated file carrying tool, comprising a frame work having sighting or eye gaging means, whereby the stroke of a file may be maintained at any desired angle with relation to the work being machined.

The object of the invention is to provide a tool of the stated character which will be of simple construction, of reasonable cost to manufacture, substantial in construction and effective in operation.

With these and other objects in view, the invention consists in certain novel features and combination of parts as will be readily understood by reference to the following specification and accompanying drawings, in which, Figure 1, is a perspective view of the tool. Fig. 2, is a plan view, showing the tool when used at an angle to the work. Fig. 3, is a fragmentary detail longitudinal sectional view. Fig. 4, is a detail vertical sectional view on the line 4—4 of Fig. 1. Fig. 5, is an end view of one of the file-holding chucks.

In the embodiment illustrated, 1, represents the frame work which comprises a yoke member 1', a handle 2, and an adjustable arm 3 carried by the yoke member 1'. The yoke 1 which is preferably integral with the handle 2, is carried thereon and is formed of a standard 4 and a right angularly extended arm 5, having the longitudinal slot 6 adjacent its free end.

Slidably mounted upon the arm 5, is the adjustable arm 3, which has a head 7 provided with a square opening of the size and shape of the arm 3. A slit 8 in the top of the head 7 forms a pair of clamping arms 9, 9, which are clamped upon the frame by means of a thumb screw 10 which extends through slot 6. From the head 7 extends a shank 11 which terminates in an enlarged part 12, having an opening 13 for the reception of a chuck 14 the same being clamped within the opening 13 by means of a thumb screw 15. The chuck 14 has formed in its inner end a triangular recess 16 which is adapted to receive the end of a triangular file, the latter being clamped within the recess by means of the wing screw 17. The handle portion 2, comprises a stock 18, provided with a recess 19, and a grip member 20. A chuck 21 conforming to the recess 19 and having a central annular reduced portion 22 is secured within the recess 19 by means of a wing screw 23 which passes through stock 18 and engages in the reduced portion 22 of the pin 21. A triangular socket 21' in the outer end of the pin 21 offers a means for holding one end of a file.

A longitudinal recess 24 is formed in the standard 4 providing a socket for the reception of a sight gage 24' which is clamped in position by a thumb screw 25.

Mounted upon the upper face of the stock 18 at its inner end beyond standard 4, and directly under the arm 5 is a transverse sight gage 26 which is clamped at any desired angle by means of the screw 27.

It will be readily seen that with the above adjustable arrangement of sight gage that after clamping the same in position a very effective sighting means is provided to enable the stroke of the file to be maintained at any desired cutting angle. Especially is this desirable when sharpening the teeth of a saw, in which case, the angle of cutting must be maintained uniform throughout the length of the saw. For instance, *a* in Fig. 2 is a saw block, and the yoke must be held at the angle shown to properly file the teeth. The gage 26, disposed at an angle which will place it parallel to the saw block *a* when said yoke is held in proper position provides a member which may be easily watched and maintained in parallel disposition to said saw block, and this will insure the proper filing of the saw teeth. The gage 24' insures a horizontal or inclined filed surface, as desired, by providing a member of considerable extent whose angular position is readily noticed.

Chuck 14, is provided at its outer end with a knob 14' which provides a convenient hand grip in operating the file carrier. The pin or chuck 21, is further provided with an opening 21'', which is hexagonal in cross section so as to readily receive files which are of similar shape at their inner ends.

What is claimed is:—

In a tool as described, a handle and a yoke member secured thereto, said handle being formed with a longitudinal opening at one end thereof, a chuck rotatable in said opening formed with a central annular groove and with an opening in its outer end to receive one end of the file, a set screw carried by the handle to engage in said groove, an arm on the yoke having an opening therein, a chuck rotatable in said opening and having an opening in its inner end to receive the opposite end of the file, and a set screw projected through said arm to secure the second chuck against movement.

In testimony whereof I affix my signature in presence of two witnesses.

WILLIE T. GRADY.

Witnesses:
J. J. Cox,
I. A. GARRETT.